United States Patent
Cheng

(10) Patent No.: US 7,290,920 B2
(45) Date of Patent: Nov. 6, 2007

(54) LIGHT GUIDE PLATE AND MANUFACTURING METHOD OF THE SAME

(75) Inventor: Shih-Ming Cheng, Taichung County (TW)

(73) Assignee: Au Optronics Corporation, Hsinchu (TW)

( * ) Notice: Subject to any disclaimer, the term of this patent is extended or adjusted under 35 U.S.C. 154(b) by 129 days.

(21) Appl. No.: 10/710,267

(22) Filed: Jun. 30, 2004

(65) Prior Publication Data

US 2005/0237767 A1   Oct. 27, 2005

(30) Foreign Application Priority Data

Apr. 22, 2004   (TW) ............................... 93111205 A

(51) Int. Cl.
  *F21V 7/04*   (2006.01)
  *B29D 11/00*   (2006.01)

(52) U.S. Cl. .................. 362/624; 264/1.24; 264/1.7; 264/1.9

(58) Field of Classification Search ............... 362/600, 362/26, 29, 602, 339, 255, 330, 327, 615, 362/616, 623–627, 629; 428/156; 264/1.24, 264/1.7, 1.9; 65/385, 386
See application file for complete search history.

(56) References Cited

U.S. PATENT DOCUMENTS 5,845,035 A * 12/1998 Wimberger-Friedl ........ 362/616
5,947,578 A * 9/1999 Ayres .......................... 362/629
6,447,135 B1 * 9/2002 Wortman et al. ............ 362/623
6,504,589 B1   1/2003 Kashima et al. .............. 349/96
6,612,722 B2   9/2003 Ryu et al. .................... 362/331
6,663,800 B1   12/2003 Lee et al. ................... 264/1.24
6,835,440 B1 * 12/2004 Konishi et al. ............. 428/156

FOREIGN PATENT DOCUMENTS

| TW | 486101 | 10/2000 |
|---|---|---|
| TW | 514766 | 1/2001 |
| TW | 556843 | 12/2002 |
| TW | 558014 | 10/2003 |
| TW | 569068 | 1/2004 |
| TW | 579410 | 3/2004 |

* cited by examiner

*Primary Examiner*—Sandra O'Shea
*Assistant Examiner*—Bao Q. Truong
(74) *Attorney, Agent, or Firm*—Jianq Chyun IP Office

(57) ABSTRACT

A method of manufacturing a light guide plate comprising the following the steps. First, a thin film with a transfer material layer thereon is provided. Thereafter, a molding machine having a molding cavity therein is provided. A thin film is disposed in the molding machine such that at least part of the transfer material layer is located inside the molding cavity. A light guide plate body is formed inside the molding cavity so that the transfer material layer is transferred onto the light guide plate body at the same time.

7 Claims, 3 Drawing Sheets

LIGHT GUIDE PLATE AND MANUFACTURING METHOD OF THE SAME

CROSS REFERENCE TO RELATED APPLICATIONS

This application claims the priority benefit of Taiwan application serial no. 93111205, filed Apr. 22, 2004.

BACKGROUND OF INVENTION

1. Field of the Invention

The present invention relates to a light guide plate and manufacturing method thereof. More particularly, the present invention relates to a light guide plate fabricated by a transfer process.

2. Description of Related Art

Due to the rapid development of semiconductor devices and man-machine interfaces, multi-media systems have found wide applications. In the past, cathode ray tube (CRT) is a dominant type of displays on the market because of its superb display quality and low production cost. However, from an environmental point of view, CRT tends to consume too much power, requires too much material to fabricate and always produces hazardous radiation in the process of operation. Hence, with considering the production of light, compact, low power rating, radiation free and high picture quality, liquid crystal display (LCD) has rapidly become the mainstream display product on the market.

Since the liquid crystal panel is not self-illuminant, a back light module must be installed accompanying with it to serve as a source of illumination. Aside from cold cathode fluorescent lamp (CCFL), light-emitting diode (LED) is another type of light source for a back light module.

FIG. 1 is a side view of a conventional back light module assembly. As shown in FIG. 1, a back light module 100 mainly comprises a light guide plate 110, a light source 120, at least a reflector 130 and a plurality of optical films 140. The light provided by the source 120 enters the light guide plate 110 through a light incident surface S1 and then reflects by a bottom surface S2 before emerging from a light output surface S3. Thus, through the light guide plate 110, light from the light source 120 is transformed into a planar light source suitable for illuminating a liquid crystal panel.

To increase the uniformity of the planar light source produced by the back light module 100, molds for forming the light guide plate 110 are often etch or electro-etched to produce a protrusion patterns. After performing an injection molding, a protrusion pattern 112 is formed on the bottom surface S2 of the light guide plate 110. Hence, light emitted from the light source 120 will be scattered by the protrusion pattern 112 on the bottom surface S2 to produce a planar light source with a high degree of uniformity. However, this method of fabricating the light guide plate is rather complicated and frequently affects other processing parameters (for example, the flow drag of molding compound affected by the protrusion pattern, the homogeneity of etching, the cooling rate and so on). Consequently, the reproducibility of the fabricated light guide plate 110 is rather low and product yield is hardly improved.

In an alternative method, a light-scattering pattern is printed onto the bottom surface S2 of the light guide plate 110. However, the printing process has to be carried out after the light guide plate 110 has formed rather than in tandem.

In addition, a reflector 130 is often attached to the bottom surface S2 of the light guide plate 110 to increase the brightness of the planar light source provided by the back light module 100. Nevertheless, attaching the reflector 130 to the light guide plate 110 increases not only processing time and production cost, but also the overall thickness of the back light module 100. Furthermore, even if reflector 130 are attached to the areas outside the light incident surface S1 and the light output surface S3 of the light guide plate 110, the possibility of light leak from gaps between the light guide plate 110 and various reflectors 130 cannot be completely eliminated. Therefore, the conventional method of fabricating a light guide plate needs some improvements before an ultra-high brightness and ultra-thin liquid crystal display can be produced.

SUMMARY OF INVENTION

Accordingly, the present invention is directed to a method of manufacturing a light guide plate that can simplify the fabrication process, lower the production cost and increase the degree of sophistication of the light guide plate.

The present invention is directed to a light guide plate having a smaller overall thickness and a lower possibility of light leakage from the light guide plate.

According to an embodiment of the present invention, the method of manufacturing the light guide plate comprises, first, a thin film having a transfer material layer thereon is provided. Thereafter, a molding machine having a cavity therein is provided. The thin film is disposed in the molding machine such that at least part of the transfer material layer is located inside the cavity. Then, a light guide plate body is formed inside the cavity so that the transfer material layer is transferred onto the light guide plate body at the same time.

In the present embodiment, the transfer material layer is a light-scattering patterned layer. Alternatively, the transfer material layer is formed, for example, via coating a light-reflecting layer over the thin film and then forming a light-scattering patterned layer over the light-reflecting layer.

The light guide plate comprises a light output surface, a bottom surface, at least a light incident surface and a plurality of side surfaces. The light incident surface and the side surfaces are adjacent to and positioned between the bottom surface and the light output surface. The light-scattering patterned layer and the light-reflecting layer are transferred on the bottom surface. Furthermore, a light-reflecting layer may further be disposed on each side surface of the light guide plate.

Furthermore, the method of disposing thin film inside the molding machine includes a tape-spooling mechanism. A spool of tape is disposed on the molding machine from one side to another such that at least a portion of the transfer material layer is disposed inside the cavity. The transfer material layer may be partitioned into a plurality of patterned blocks so that rolling the tape forward a definite distance will align at least one patterned block with the cavity.

The present invention also provides a light guide plate. The light guide plate comprises a light guide plate body and a transfer material layer. The light guide plate body has a light output surface, a bottom surface, at least a light incident surface and a plurality of side surfaces. The light incident surface and the side surfaces are adjacent to and positioned between the bottom surface and the light output surface. The transfer material layer is disposed on the bottom surface.

In the present embodiment, the transfer material layer and the light guide plate body are formed into a unity. The transfer material layer is a light-scattering patterned layer, for example. Alternatively, the transfer material layer comprises a light-scattering patterned layer and a light-reflecting layer. The light-scattering patterned layer and the light-reflecting layer are disposed on the bottom surface. More specifically, the light-reflecting layer may be disposed on the bottom surface and covering the light-scattering patterned layer. Furthermore, a light-reflecting layer may further be disposed on each side surface of the light guide plate.

In brief, the method of fabricating the light guide plate includes providing a thin film having a transfer material layer thereon and then simultaneously transferring the transfer material layer to the light guide plate when the light guide plate body is formed in a molding process. Hence, not only is the fabricating process of the light guide plate greatly simplified, but also reduces the overall thickness of the light guide plate because a conventional reflector is no longer required. Moreover, the method permits the production of a highly sophisticated light guide plate and the tape transfer mechanism speeds up the delivery of thin film to the molding machine.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
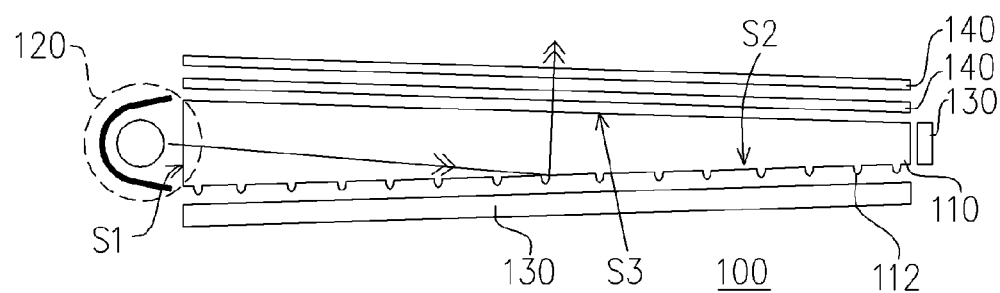
FIG. 1 is a side view of a conventional back light module assembly.

Reference will now be made in detail to the present preferred embodiments of the invention, examples of which are illustrated in the accompanying drawings. Wherever possible, the same reference numbers are used in the drawings and the description to refer to the same or like parts.

Figure 2:
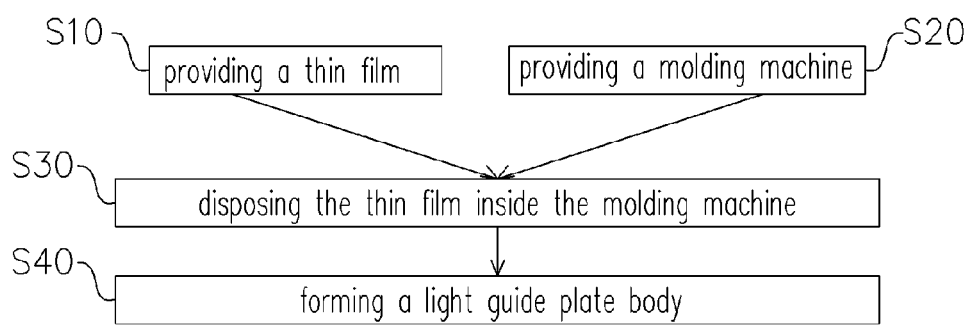
FIG. 2 is a flow diagram showing the steps for producing a light guide plate according to one embodiment of the present invention.
Figures 3A, 3B:
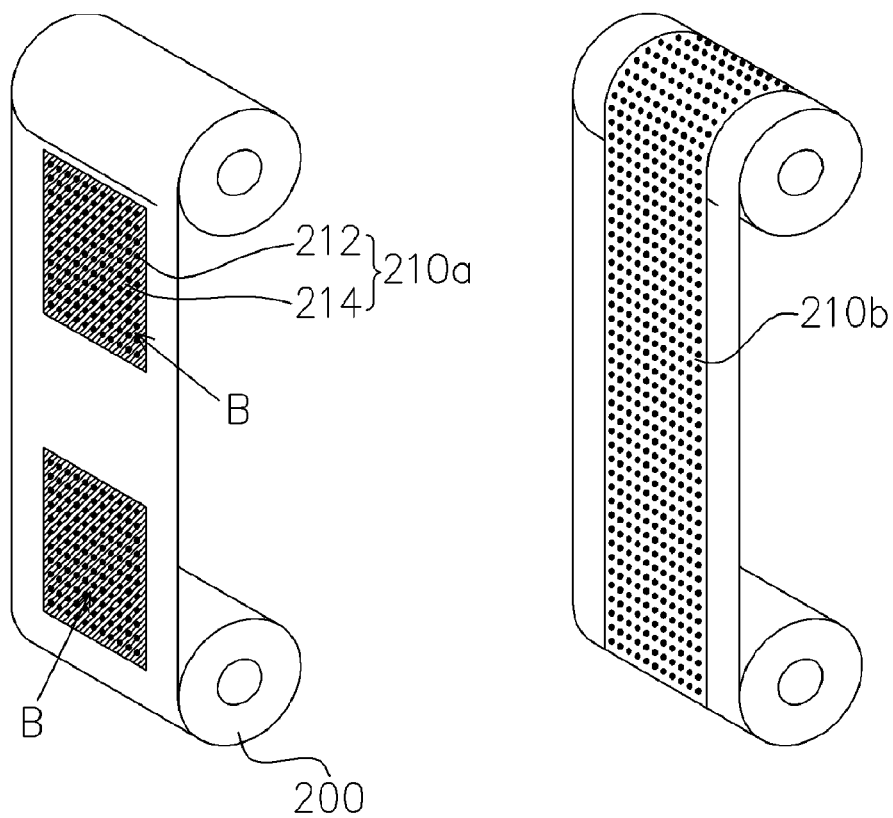
FIGS. 3A and 3B show two types of tape transfer systems for delivering thin films according to an embodiment of the present invention.

FIG. 2 is a flow diagram showing the steps for producing a light guide plate according to one embodiment of the present invention. FIGS. 3A and 3B show two types of tape transfer systems for delivering thin films according to an embodiment of the present invention. To form a light guide plate, a thin film 200 having a transfer material layer 210a thereon is provided (step S10) as shown in FIGS. 2 and 3A. The thin film 200 is a spool of tape fabricated using polyester (PET), for example.

The transfer material layer 210a are disposed on the thin film 200 as patterned blocks B (shown in FIG. 3A) or the transfer material layer 210b are disposed on the thin film 200 as a continuous band (shown in FIG. 3B). In the following, the process of fabricating the light guide plate is illustrated.

As shown in FIG. 3A, the transfer material layer 210a over the thin film 200 is formed, for example, by printing. The steps of forming the transfer material layer 210 include coating a light-reflecting layer 212 over the thin film 200 and then forming a light-scattering patterned layer 214 over the light-reflecting layer 212. The pattern on the light-scattering patterned layer 214 is regular grid points, irregular grid points or other optimized designs that can provide a beam of incident light with an optimal dispersion effect. The light-scattering patterned layer 214 is fabricated using a material such as a thermal transfer ink. The light-reflecting layer 212 is fabricated using a highly reflective material suitable for transfer printing operation.

Obviously, the steps of forming the transfer material layer 210a may just include coating a light-reflecting layer 212 over the thin film 200 or forming a light-scattering patterned layer 214 over the thin film 200 according to the design requirements.

Figure 4:
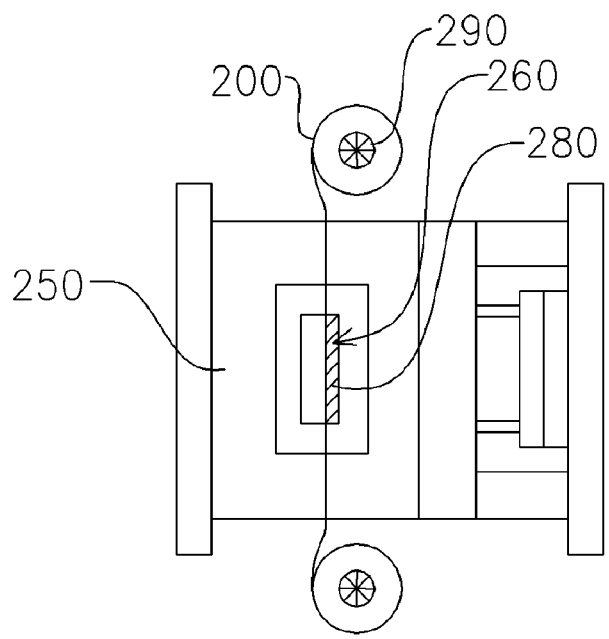
FIG. 4 is a schematic cross-sectional view of various components of a light guide plate according to an embodiment of the present invention.

FIG. 4 is a schematic cross-sectional view of various components of a light guide plate according to an embodiment of the present invention. As shown in FIGS. 2 and 4, a molding machine 250 for forming light guide plates is provided (in step S20). The molding machine 250 is an injection-molding machine, for example. The molding machine 250 has a cavity 260. Thereafter, the thin film 200 having transfer material layer 210a (shown in FIG. 3A) thereon is disposed inside the molding machine 250 (in step S30) in such a way that one of the patterned blocks B is located inside the cavity 260. Finally, material is injected into the cavity 260 to form a light guide plate body 280 (in step S40). In the process of forming the light guide plate body 280, the transfer material layer 210a will detach from the thin film 200 and transfer to the light guide plate body 280.

In addition, a tape-spooling mechanism 290 may be utilized to dispose thin film 200 over the molding machine 250. Through the tape-spooling mechanism 290, thin film 200 is permitted to reel over the molding machine 250 and provide a patterned block B of transfer material layer 210a into the cavity 260. After performing an injection to form a light guide plate body 280, the spool of film 200 rolls on to bring in another patterned block B of transfer material layer 210a into the cavity 260. If the transfer material layer 210b in FIG. 3B is used, the tape-spooling mechanism 290 drives the spool of film 200 forward to bring an unused transfer material layer 210b over the cavity 260.

Obviously, the thin film 200 is not limited to a spool of tape and the driving mechanism for the thin film 200 is not limited to a tape-spooling mechanism 290. A sheet of thin film 200 may be delivered to the cavity 260 one at a time using various types of transport mechanisms. Alternatively, the molding machine 250 may have a plurality of cavities 260 such that the bodies of a number of light guide plates 280 are formed simultaneously in a single injection molding operation.

Figure 5:
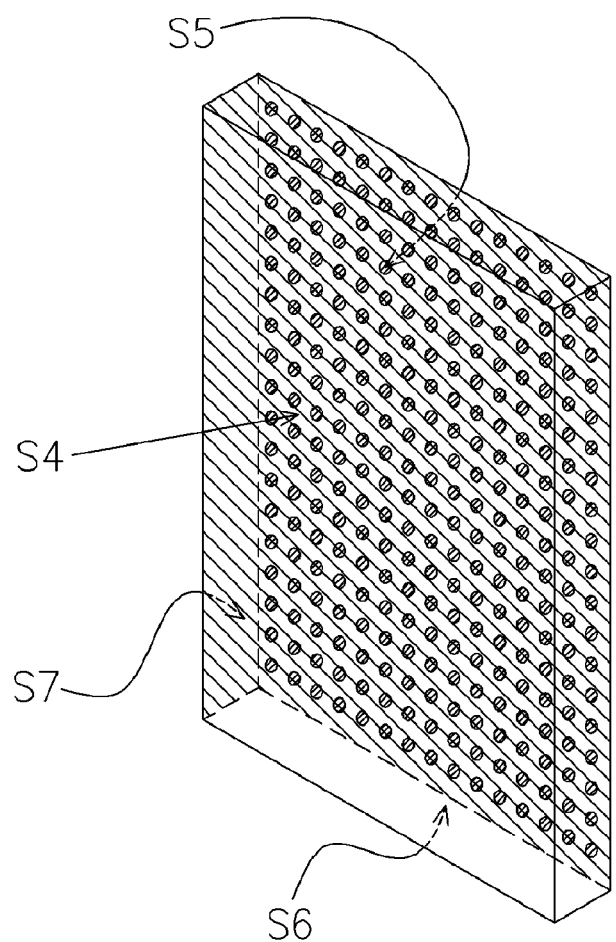
FIG. 5 is a perspective view of a light guide plate fabricated according to an embodiment of the present invention.
Figure 6:
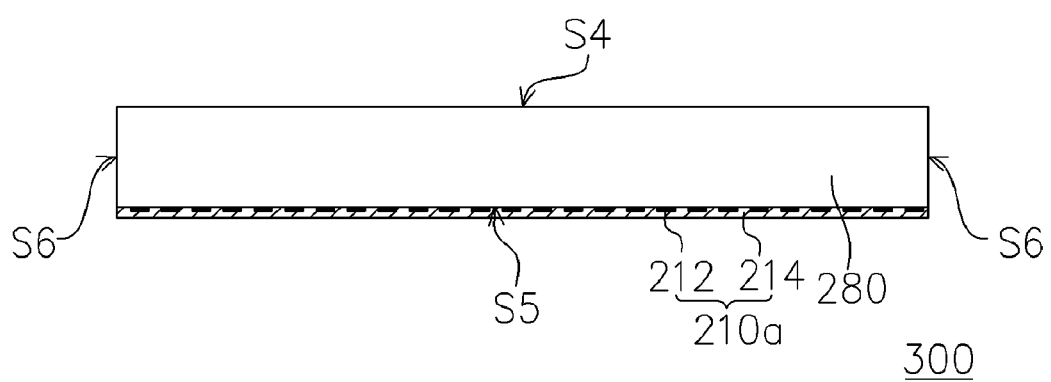
FIG. 6 is a schematic cross-sectional view of the light guide plate in FIG. 5.

FIG. 5 is a perspective view of a light guide plate fabricated according to the present invention. FIG. 6 is a schematic cross-sectional view of the light guide plate in FIG. 5. The light guide plate 300 of the present invention mainly comprises a light guide plate body 280 and a transfer material layer 210a as shown in FIGS. 5 and 6. The light guide plate body can be fabricated into a wedge shape, a plane rectangular shape or other geometric shapes, for example. In the present embodiment, the light guide plate body 280 having a plane rectangular shape is illustrated.

The light guide plate body 280 has a light output surface S4, a bottom surface S5, a pair of light incident surfaces S6 and a pair of side surface S7. The light incident surfaces S6 and the side surfaces S7 are adjacent to and positioned between the bottom surface S5 and the light output surfbce S4. The transfer material layer 210a is at least transferred on the bottom surface S5. Since the transfer material layer 210a is transfeged on the bottom surface S5 when the light guide plate body 280 is formed, the transfer material layer 210a and the light guide plate body 280 can be formed into a unity. The light-scattering patterned layer 212 and the light-reflecting layer 214 can be transferred on the bottom surface S5. Obviously, a light-reflecting layer 214 may also be transferred on the side surfaces S7, In other words, a light-reflecting layer can be transferred toall the surfaces of the light guide plate body 280 except the light output surface S4 and the light incident surfaces S6, hence, light leaking is prevented. Understandably, the light-reflecting layer 214 may be transferred onto the bottom surface S5 only.

In the present embodiment, the transfer material layer 210a comprises a light-scattering patterned layer 212 and a light-reflecting layer 214. Clearly, the transfer material layer 210a can also be a single light-scattering layer 212 or a single light-reflecting layer 214.

In summary, the method of fabricating the light guide plate according to the present invention includes providing a thin film having a transfer material layer thereon and then transferring the transfer material layer onto the light guide plate in the injection process for forming the light guide plate body. Hence, the fabrication of a highly sophisticated mold using specialized techniques is rendered unnecessary. Furthermore, the simplification of processing parameters also permits the fabrication of light guide plates with highly sophisticated properties. Moreover, the light-reflecting layer on the light guide plate body can be formed into a unity. Since there is no need to attach a reflector as in the conventional technique, overall thickness of the light guide plate is reduced. In addition, light leaking is also prevented and the brightness of the back light module increases. Finally, the tape-spooling mechanism for dispensing thin film over the cavity also speeds up the process of fabricating the light guide plate and lowers unit production cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A method of fabricating a light guide plate, comprising the steps of:
   providing a thin film having a transfer material layer thereon;
   providing a molding machine having a cavity therein;
   disposing the thin film inside the molding machine such that at least a portion of the transfer material layer is located within the cavity; and
   forming a light guide plate body inside the cavity after the thin film is disposed inside the molding machine such that the transfer material layer is transferred on the light guide plate body from the thin film.

2. The method of claim 1, wherein the transfer material layer comprises a light-scattering patterned layer.

3. The method of claim 1, wherein a step of forming the transfer material layer over the thin film comprises:
   forming a light-reflecting layer over the thin film; and
   forming a light-scattering patterned layer over the light-reflecting layer.

4. The method of claim 3, wherein the light guide plate body comprises a light output surface, a bottom surface, at least a light incident surface and a plurality of side surfaces, wherein the light incident surface and the side surfaces are adjacent to and positioned between the bottom surface and the light output surface, and the light-scattering patterned layer and the light-reflecting layer are transferred on the bottom surface.

5. The method of claim 4, wherein the light-reflecting layer is further transferred or, the side surfaces.

6. The method of claim 1, wherein the step of disposing the thin film inside the molding machine comprises applying a tape-spooling mechanism to reel the thin film over the molding machine so that at least a portion of the transfer material layer is disposed inside the cavity.

7. The method of claim 6, wherein the transfer material layer comprises a plurality of patterned blocks so that at least one of the patterned blocks aligns with the cavity after reeling the thin film forward a fixed distance.

* * * * *